United States Patent [19]

Breitling

[11] 3,964,398
[45] June 22, 1976

[54] MAGNETIC-SUSPENSION VEHICLE SYSTEM HAVING SWITCH TRACKS

[75] Inventor: Ulrich Breitling, Berlin, Germany

[73] Assignee: Krauss-Maffei Aktiengesellschaft, Munich, Germany

[22] Filed: Feb. 19, 1975

[21] Appl. No.: 551,055

[30] Foreign Application Priority Data
Mar. 9, 1974   Germany............................ 2411434

[52] U.S. Cl. ......................... 104/148 MS; 104/130
[51] Int. Cl.² ........................................ B61B 13/08
[58] Field of Search............ 104/105, 130, 148 MS, 104/148 LM, 148 SS, 134, 96, 23 FS

[56] References Cited
UNITED STATES PATENTS

| | | | |
|---|---|---|---|
| 3,822,647 | 7/1974 | Hill et al. ............................ | 104/130 |
| 3,842,747 | 10/1974 | Schwarzler........................... | 104/130 |
| 3,847,086 | 11/1974 | Steenbeck............................ | 104/130 |
| 3,851,594 | 12/1974 | Schwarzler........................... | 104/130 |

FOREIGN PATENTS OR APPLICATIONS

| | | | |
|---|---|---|---|
| 707,032 | 3/1941 | Germany...................... | 104/148 MS |

*Primary Examiner*—Trygve M. Blix
*Assistant Examiner*—Galen L. Barefoot
*Attorney, Agent, or Firm*—Karl F. Ross; Herbert Dubno

[57] ABSTRACT

A magnetic-suspension vehicle system in which a vehicle is displaceable along a track provided with armature rails which co-operate with electromagnets carried by the vehicle to suspend the latter from the track. Switch locations are provided along the track and the rails in these regions are designed to allow crossover of the electromagnetic arrangement on each side of the vehicle between main and auxiliary rails. The main and auxiliary rails are shaped to prevent mutual interference at the crossover points or their junction sites at a common side of the vehicle.

8 Claims, 11 Drawing Figures

U.S. Patent June 22, 1976 Sheet 1 of 3 3,964,398
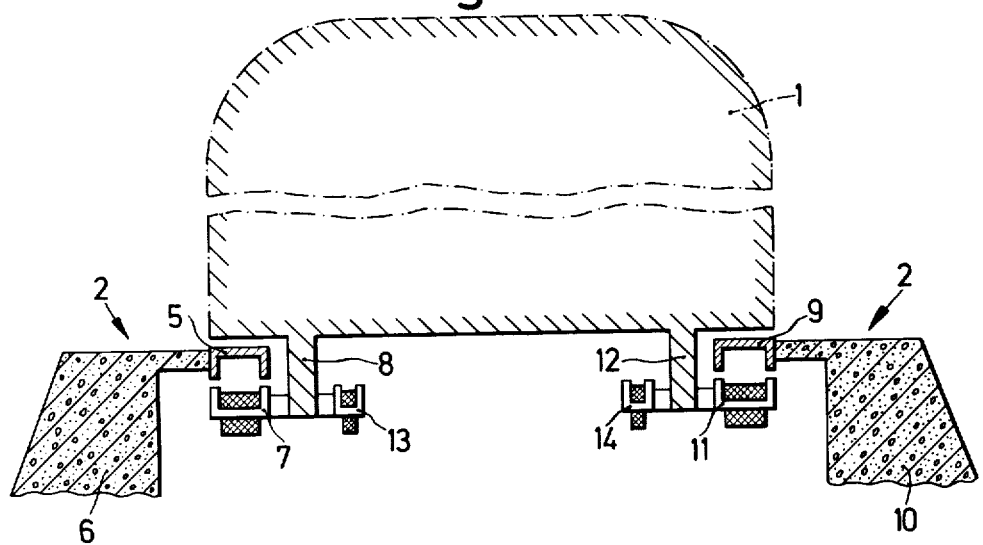
Fig. 1
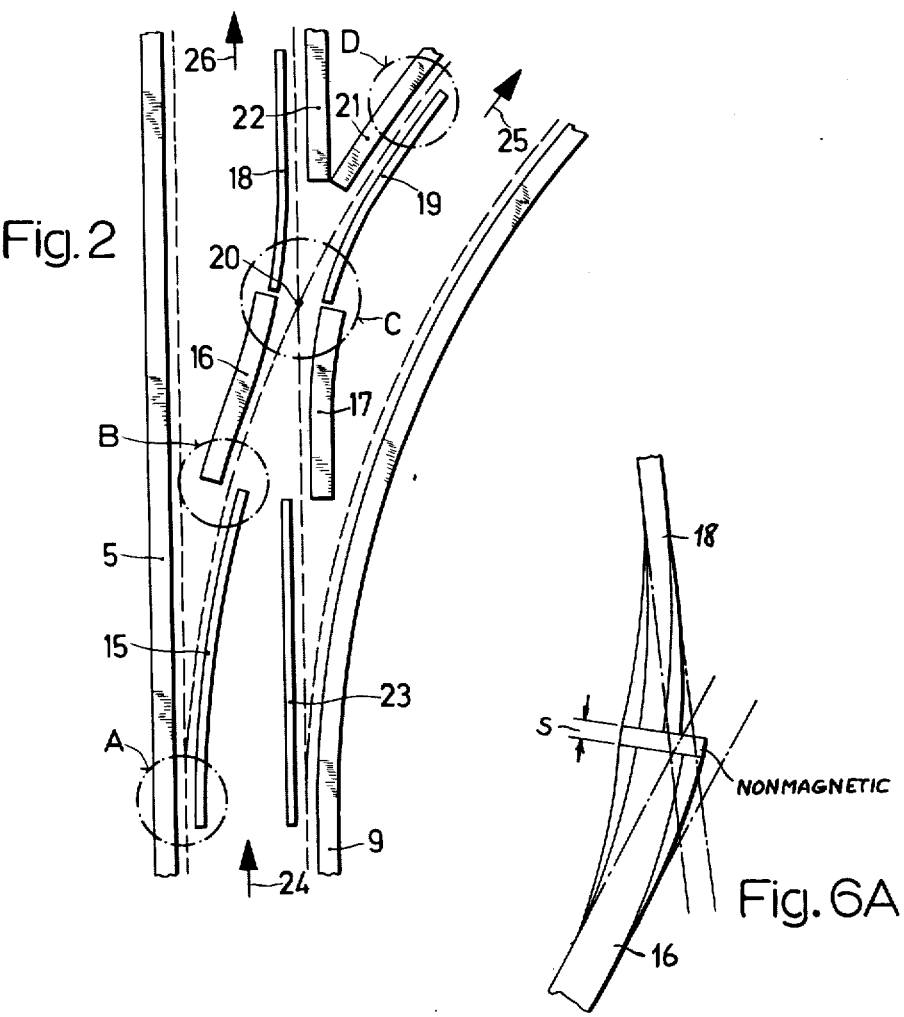
Fig. 2
Fig. 6A

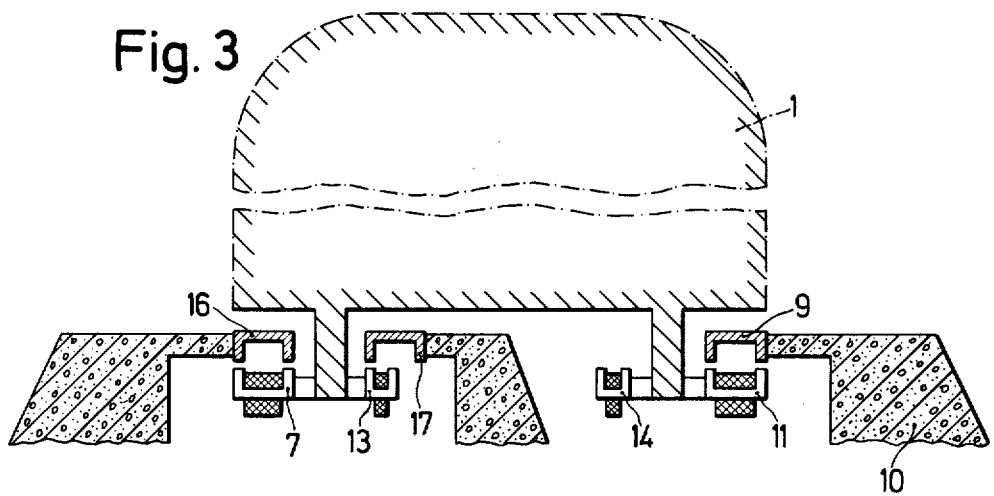
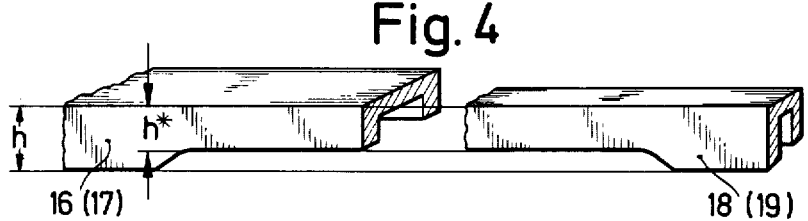
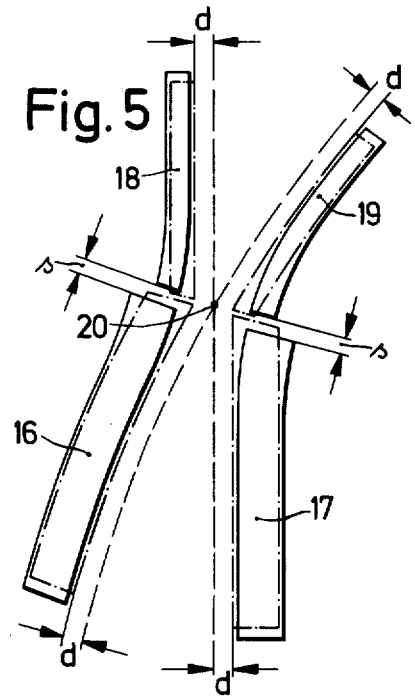
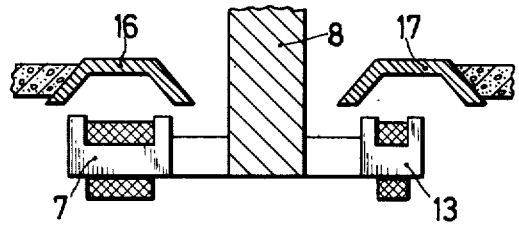

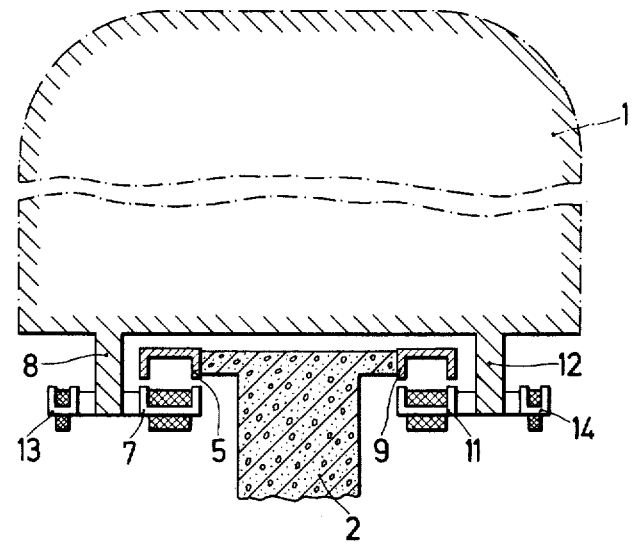
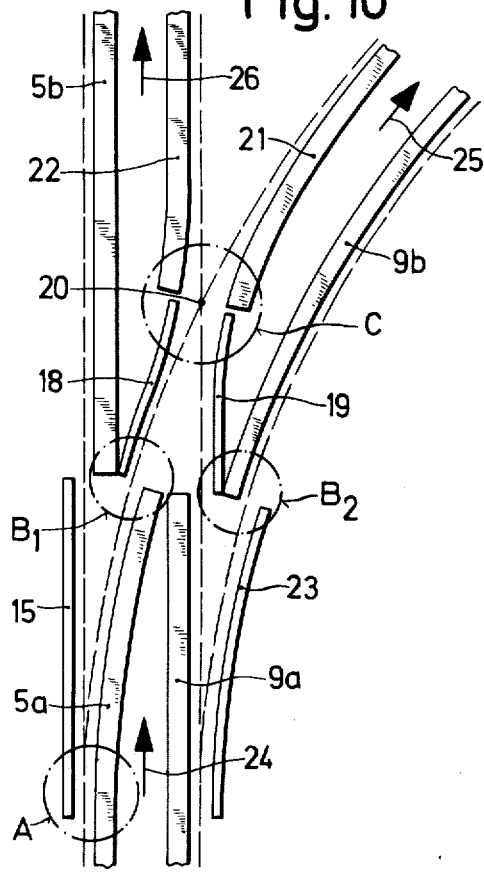
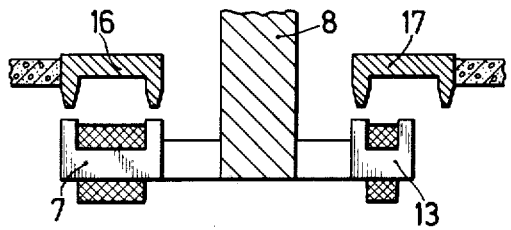
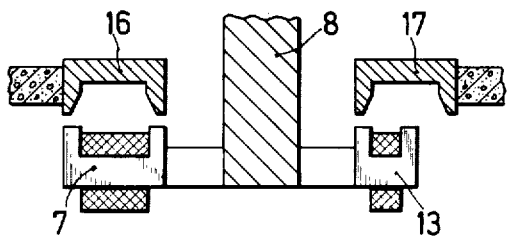

MAGNETIC-SUSPENSION VEHICLE SYSTEM HAVING SWITCH TRACKS

CROSS-REFERENCE TO RELATED APPLICATIONS

The present application is related to the commonly assigned copending application Ser. No. 447,560 filed March 4, 1974 by Ulrich Breitling and Klaus Simon (entitled ELECTROMAGNETIC-SUSPENSION VEHICLE SYSTEM) (now U.S. Pat. No. 3,924,538). That application is related to and extends principles originally set forth in the commonly assigned copending application Ser. No. 362,012 filed May 21, 1973 and entitled MAGNETIC SUSPENSION AND GUIDE SYSTEM FOR SUSPENDED VEHICLES ADAPTED TO SWITCH TRACKS (now U.S. Pat. No. 3,851,594). The latter application is, in turn, a continuation-in-part of the commonly assigned copending application Ser. No. 324,135 filed Jan. 16, 1973 and entitled ELECTROMAGNETIC SUSPENSION AND GUIDE SYSTEM FOR VEHICLES ADAPTED TO SWITCH TRACKS (now U.S. Pat. No. 3,842,747).

The aforementioned applications are also related to the commonly assigned applications (then pending):

Ser. No. 268,133 filed June 30, 1972 and entitled ELECTROMAGNETIC SUSPENSION AND DRIVE MEANS; (now U.S. Pat. No. 3,797,403).

Ser. No. 280,073 filed Aug. 11, 1972 and entitled ELECTROMAGNETIC SUSPENSION AND/OR GUIDE SYSTEMS, ESPECIALLY FOR MAGNETIC SUSPENDED VEHICLES (U.S. Pat. No. 3,780,668); and Ser. No. 292,638 filed Sept. 27, 1972 and entitled CONTACT SYSTEM FOR HIGH SPEED ELECTRICALLY OPERATED VEHICLES (U.S. Pat. No. 3,804,997).

FIELD OF THE INVENTION

The present invention relates to track systems for electromagnetically suspended or magnetic-levitation vehicles having the capability of switching tracks on passing from the main track to a branch of a spur or adapted to cross switch portions of such tracks. More particularly, the present invention relates to an arrangement in such a system for reducing magnetic shock and interference by magnetic systems at switch locations.

BACKGROUND OF THE INVENTION

As described in application Ser. No. 447,560 (U.S. Pat. No. 3,924,538), earlier mass-transport systems have generally been confined to a rolling vehicle displaceable by electrical or other means along a track or right of way engaged by the vehicle wheels. This system had the advantage that it was capable of carrying substantially unlimited loads, since all of the forces were applied substantially directly via the wheel structures to the supporting surface or rails of the tracks or roadbed.

With greater need for high-speed mass transit, however, such systems have given way to low-friction systems which are not as limited with respect to the speed of the vehicle. For example, electromagnetic-suspension vehicles or magnetic-levitation vehicles have been proposed in which the track is provided with a pair of longitudinally extending magnetically permeable rails while the vehicle is provided with complementary magnetic means so that a magnetic field can close between the vehicle and the track, the forces being transmitted to the latter by the magnetic field spanning the suspension gap.

As described in some of the aforementioned applications, the track can comprise a pair of armature rails each of which is juxtaposed with the electromagnets on the vehicle and a suspension gap is provided between the electromagnet and the armature rails. In the basic system of application Ser. No. 362,012 (U.S. Pat. No. 3,851,594), for example, there is an electromagnetic suspension and guide system for suspended vehicle adapted to switch tracks. The switching of tracks is necessary when the vehicle is to be diverted from a main line onto a spur or branch or is to pass along the main line of the track network across a branch location. A switch arrangement is necessary also when two tracks cross or feed one into the other.

In the arrangement of this latter application, the problem of interruption of the main armature rails at the crossings was solved by providing two sets of rails at the crossing in mutually overlapping relationship in the longitudinal direction. More particularly, the vehicle and track systems comprise a vehicle having two rows of electromagnets on each side, each electromagnet consisting of a U-section core and a coil around its web, each armature rail having a U-configuration so that the shanks of the U define poles which co-operate with the poles of the electromagnets.

A similar system is described in Ser. No. 324,135 (U.S. Pat. No. 3,842,747) such that main and auxiliary rows of electromagnets are provided but each electromagnet consists of a core and an electromagnetic coil wound on this core whereby at least the cores are of such configuration that substantially symmetrical and equivalent magnetic flux paths are adapted to be closed therewith by armature rails approaching the electromagnets selectively from each side, i.e. a main and an auxiliary armature rail which operate alternatively. The vehicles could be driven by linear induction motors as described in application Ser. No. 324,150 filed Jan. 15, 1973 and entitled TWO-SIDED LINEAR INDUCTION MOTORS, ESPECIALLY FOR SUSPENDED VEHICLES (now U.S. Pat. No. 3,820,472).

As pointed out in application Ser. No. 447,560, the problem prior to the development there described was to avoid any intense increase or diminution in the overall magnetic resistance encountered by each longitudinally extending electromagnet arrangement and hence to prevent doubling of the magnetic force which would otherwise be expected because of the simultaneous action of two armature rails and two subrows of electromagnets along each side of the vehicle.

Application Ser. No. 447,560 (U.S. Pat. No. 3,924,538) improved upon the earlier devices by providing a levitation-type vehicle which comprised a pair of transversely spaced longitudinally extending magnet arrangements, each formed from a respective row of electromagnets and lying within the outlines of the vehicle body while depending from the bottom thereof, each of these rows magnetically cooperating with an armature arrangement. The armature arrangement comprised a pair of armature rails selectively cooperating with one or the other subrow of magnets of each main row. The electromagnets had substantially U-section cores to co-operate with the armature rails.

This arrangement allowed the vehicle to pass from a single-beam track to a double-beam track or vice versa. A single-beam track is a central-support structure straddled by the vehicle. A double-beam arrangement is a track structure of the channel type in which the two beams of the track flank the vehicle. Because of the ability of the electromagnets to cooperate either with the central support or single beam structure and the outer support or double-beam structure, the vehicle may pass through cross-overs and onto branch tracks and spurs without difficulty and without requiring movable track members. For example, when one of the outer beams must be interrupted to permit a branching of the vehicle to that side, a central-beam support is provided in this region whereby asymmetric support of the vehicle may be obtained temporarily to permit branching.

Within the cross-overs and branch junctions, the magnetic supporting and guiding function was shifted from an outer subrow of electromagnets to an inner subrow and vice versa several times depending upon the complexity of the switching or crossing function.

Where main rows electromagnets, generally consisting of two subrows, encounter two armature rails simultaneously at such junctions, the magnetic shock or increased magnetic force was of considerable disadvantage and inconvenience unless various techniques were used to provide for nullification of this additional force. The earlier systems to achieve such nullification, described in the aforementioned copending applications, were relatively expensive. They, for example, required flux nullification coils on the various armature rails.

The system described in application Ser. No. 447,560 (U.S. Pat. No. 3,924,538) avoids that problem by providing one of the subrows of the electromagnets of each arrangement as a row of main electromagnets and the other subrow as a row of auxiliary electromagnets and providing the armature rail co-operating with the main electromagnets and the auxiliary electromagnets as main and auxiliary armature rails respectively. The armature rails of the main system can have a pole spacing different from the pole spacing of the armature rails of the auxiliary system so that an encounter between the main armature rail and an auxiliary electromagnet or an auxiliary armature rail and a main electromagnet will not have as effective flux-path closure and hence will be of more limited magnetic affect than would have been the case where the main armature rails are confronted by auxiliary electromagnets of the same pulse speed.

In spite of the expedients described above, it has been found that transport systems with suspended vehicles, which are supported and guided electromagnetically, are prone to interference between the main and auxiliary systems at crossovers, junctions and switches. In a typical system, the track may be provided with a pair of main armature rails extending substantially continuously therealong and the vehicle can have a pair of main electromagnets respectively co-operating with these rails and provided on the outer sides of the vehicle. Along each of the main electromagnets there may be provided a respective row of auxiliary electromagnets so that on each side of the vehicle there is provided an electromagnetic suspension and guiding arrangement. At a branch to the right of a vehicle from the main track, for example, the main electromagnet at the right hand side of the vehicle may remain continuously effective since this limb of the curve is not interrupted and the main armature rail on the right-hand side is continuous. However, since the outer curve side of the vehicle veers away from the continuous main armature rail on the left-hand side, the switch portion must be provided with an auxiliary armature rail which co-operates with the auxiliary electromagnet on the left-hand side to provide temporary support of the vehicle through this portion of the junction. As the auxiliary rail on the outer limb of the curve or the left-hand side of the vehicle approaches the normal straight trace of the right-hand main magnetic arrangement, it must be interrupted and hence beyond this trace, support must be picked up by outer limb auxiliary armature rail co-acting with the left-hand auxiliary electromagnets of the vehicle. In the space between these two portions of auxiliary armature rail, there may be provided a stretch of left-hand main armature rail or right-hand main armature rail in a "frog". Where the magnetic axis of the left-hand main electromagnet arrangement and the magnetic axis of the right-hand electromagnet arrangement of the vehicle cross, there is an intersection at which various armature rails approach one another and interfere with the suspension and guiding function.

On passing over a switch portion of the track, all of the supporting and guiding forces for the suspended vehicle on one vehicle side or the other (depending upon whether the vehicle is proceeding into the spur or continues along the main track) are produced alternately by the main magnet system and the auxiliary magnet system. The use of the main magnet system or the auxiliary magnet system is dependent upon the mutual positions of the primary and the secondary part is a necessary condition for producing the required supporting and guidance forces.

The term "primary part" and "secondary part" are used herein to distinguish between the electromagnet (active member) and the armature rail (passive member), it being noted that, in principle, one part or the other can be mounted upon the vehicle and another upon the track. In other words, while the aforementioned applications have generally disclosed systems in which the electromagnet is provided upon the vehicle and the armature rail upon the track and such systems are preferred. It is also conceivable to provide electromagnets along the track which cooperate with armature rails carried by the vehicle.

The parts attached to the track of the main and auxiliary magnet system form a point of intersection at which, for example, two armature rails of the main electromagnet system abut, adjoin or are coterminous with a respective armature rail of the auxiliary electromagnet system and at an obtuse angle.

It has been found that high vehicle speeds, e.g. about 500 km per hour, prevent instantaneous switch-off of one magnet system (e.g. the main magnet system) and simultaneously switch-on of the other magnet system (e.g. the auxiliary magnet system) so that the main electromagnet is only effective in the regions in which it is juxtaposed with the main armature rail and the auxiliary electromagnets are effective only where they are juxtaposed with auxiliary armature rails.

Thus the above mentioned points-of-intersection are traversed by the vehicle with either the main electromagnet energized in the region of the main armature rail, or both on the outside-curve vehicle side.

Accordingly, adjacent the adjoining site (rail-junction region) there occurs an interfering action between the primary part of one magnet system and the secondary part of the other magnet system in addition to the desired suspending and guiding action between the primary and secondary parts of the selected magnet system.

In other words, for example, the electromagnet of the main magnet system on the outer curve side of the vehicle may generate magnetic force by interaction with the auxiliary armature rail of the auxiliary magnet system on this side. These forces create perturbations in the travel of the vehicle and generate discomfort and mechanical shock with its destructive effect upon the structure, and create the need for strengthened supporting structures. Such supporting structures, where they are provided upon the vehicle increase energy consumption and reduce the vehicle payload. With an increase in the distance of the suspended vehicle from the above mentioned point-of-abutment (junction site) the interfering magnetic field decreases because of the rapidly increasing air gap between the primary part of one magnet system and the secondary part of the other.

The mechanical jolts which are applied to the suspended vehicle by the interfering magnetic field in a direction perpendicular to the direction of travel have been found in the past to limit the maximum permitted speed of the vehicle at the switch portion. Furthermore, such vehicles are generally provided with compensating circuitry to provide an electromagnetic counteraction to any perturbations in the path of travel of the vehicle. The speed of response of such corrective equipment must be increased where perturbations are experienced, thereby increasing the cost of the system.

OBJECTS OF THE INVENTION

It is the principal object of the present invention to provide an electromagnetic suspension or magnetic-levitation vehicle system which avoids the aforedescribed disadvantages and improves upon the systems described in the aforementioned copending application.

Another object of the invention is to provide a vehicle system having switch portions in which the main and auxiliary magnet systems in a region of transitional or alternate operations are decoupled adjacent the armature rail points of intersection or junction sites.

SUMMARY OF THE INVENTION

These objects and others which will become apparent hereinafter are attained in a transport system having a track member and a vehicle member displaceable along the track member and provided on opposite sides each with a main magnet system and an auxiliary magnet system. Each of the magnet systems comprises an electromagnetic or primary part and an armature rail or secondary part adapted, upon energization of the electromagnet, to cooperate with one another and produce a vehicle-suspending force between them. One part of each system is mounted upon the vehicle and the other part of each system is mounted upon the track, the track part having a point-of-intersection or junction site at switch portions of the track. The point-of-intersection or junction site is defined as that point at which oppositely directed imaginary lines extending from each of the parts on the track at the switch portions intersect.

According to the invention, the parts attached to the track are so constructed and arranged as to reduce the magnetic interaction between the part of one system carried by the vehicle and the part of the other system on the track to a degree substantially less than the magnetic interaction between the parts of each of the systems.

This is accomplished by increasing the air gap between one part of one system on the track member and the part of the other system on the vehicle member and/or by increasing similarly the induction leakage.

According to another feature of the invention, the point of intersection of junction site is formed by the secondary parts of the main electromagnet system and of the auxiliary electromagnet system (i.e. the armature rails) respectively and the distance between the secondary parts of the main and auxiliary electromagnet systems and the imaginary lines running to their common point of intersection is steadily increased through the junction region or to the latter.

It has been found that similar effects can be achieved when the limb height (the height of the shank of U-section armature rails) of the secondary parts of the main or auxiliary electromagnet systems is reduced sharply toward the junction region or point of intersection.

Still another technique for achieving the desired elimination of magnetic interference is to provide an air gap or body of nonmagnetic material between the proximal ends of the secondary parts of the two systems adjacent the point of intersection.

Finally, the present invention provides that the secondary parts of the main and auxiliary electromagnet system may have different limb shapes in the region of the junction by comparison with the limb shape outside the junction region.

All of these measures may be present individually or concurrently.

As a result of the use of one or more of these measures (alone or in mutual combination) a substantially jolt-free passage of the suspended vehicle is possible over the point of intersection or junction region without reducing the speed of the vehicle significantly below the speed on track portions remote from the switch. Furthermore these measures eliminate the need for expensive regulating equipment on the vehicle to compensate for possible jolts and the mechanical strength of the support structures of the vehicle can be designed for smaller stresses and loading because of the elimination of the above mentioned impact or jolt forces.

BRIEF DESCRIPTION OF THE DRAWING

The above and other objects, features and advantages of the present invention will become more readily apparent from the following description, reference being made to the accompanying drawing in which:

FIG. 1 is a diagrammatic transverse vertical section through a suspended vehicle in a system according to the present invention;

FIG. 2 is a diagrammatic plan view of a switch portion of the track of this vehicle system;

FIG. 3 is a section similar to FIG. 1 but showing the vehicle passing into a spur to the right shortly before it encounters the armature-rail point of intersection;

FIG. 4 is a perspective view of the armature rail arrangement adjacent the point of intersection;

FIG. 5 is a plan view of the point of intersection in which the solid lines illustrate the disposition of the armature rails in accordance with the present invention while the dot-dash lines show extensions of the armature rails without the present modification and in accordance with earlier practice;

FIGS. 6 through 8 are cross sections through different embodiments of the main and auxiliary magnet systems on the vehicle (the outer-curve side in FIGS. 7 and 8) showing the relationships before the vehicle reaches the point of intersection or junction site;

FIG. 6A is a view of the region adjacent the junction site according to an embodiment of the invention;

FIG. 9 is a section similar to FIG. 1 showing application of the principles to a single-beam track structure; and FIG. 10 shows the arrangement of the armature rails in its application to a single-beam track structure.

SPECIFIC DESCRIPTION

The vehicle system shown in FIGS. 1 and 2, apart from the modifications discussed below, can correspond to those described in the aforementioned copending applications and can include a vehicle 1 which is displaceable along a track 2 of the channel or double beam-type so that the aprons of the vehicle are straddled by the track. The vehicle may be propelled by a linear-induction motor, may be provided with laterally effective guiding electromagnets cooperating with armature rails on the track, and may have pick up shoes for transmitting electric current from rails to the track to the vehicle, all as described in the aforementioned copending applications. Furthermore there may be provided regulating circuitry to adjust the electromagnetic forces to maintain constant suspension and guiding gaps as there described.

The suspension and guiding forces are produced by main electromagnets 7 and 11 carried on support arms or aprons 8 and 12 along opposite sides of the vehicle, and cooperating with main armature rails 5 and 9. As can be seen from FIG. 1, the main armature rails 5 and 9 of ferromagnetic material are of inverted-U cross section and are affixed to the beams 6 and 10 of the track 2. The electromagnets 7 and 11 comprise U-section cores with the same shank or pole spacing as the main electromagnets 5 and 9 with which they are juxtaposed, and have webs carrying the respective electromagnets which can be energized and constructed as described in the aforementioned copending applications. Consequently, magnetic circuits are closed between each core and the respective armature rail to generate magnetic forces across the gap between them and frictionlessly support the vehicle 1 upon the track 2.

In the embodiment illustrated, the electromagnets 7 and 11 are provided on outer sides of the respective arms 8 and 12 with respect to the longitudinal axis of the vehicle.

The support arms 8 and 12 are also provided inwardly of the electromagnets 7 and 11, respectively with auxiliary electromagnets 13 and 14 which cooperate with corresponding auxiliary armature rails 15, 18, 19 and 23 best seen in FIG. 2.

Along those portions of the track removed from the switch portion shown in FIG. 2, only the main electromagnets are operated while, within a switch portion, the auxiliary electromagnets are employed in addition to the main electromagnets for temporarily supporting and guiding the vehicle.

The magnetically suspended vehicle 1 is propelled by one or more linear-induction motors having stators carried by the vehicle and cooperating with reaction rails mounted on the track as described in any of the aforementioned applications. The reaction rails may be formed directly upon the armature rails 5 and 9 for greater strength of the assembly and convenience of mounting.

FIG. 2 shows diagrammatically a plan view of a switch portion of the track without moving parts. Thus there is no switching frog which must be displaced to switch the vehicle from the main track to the spur.

In FIG. 2 the main armature rails are shown to be of greater width than the auxiliary armature rails.

The main armature rails thus are members 5, 9, 16, 17, 21 and 22 while the auxiliary armature rails are represented at 15, 18, 19 and 23.

In order to enable a better understanding of the arrangement according to the invention at the rail-junction site C (i.e. the region of the intersection points 21 of the main and auxiliary armature rails), the operation of a vehicle proceeding through the switch portion of the track in different modes will be explained below.

Assuming a passage of the vehicle along the main track in the direction of arrows 24, 26. In this case the main electromagnet 7 cooperating with the armature rail 5 remains continuously energized at all times to support the left-hand side of the vehicle upon the continuous main armature rail 5. The corresponding auxiliary electromagnet 13 remains deenergized over the entire passage of the vehicle through this portion of the track.

However, since the main armature rail 9 at the right-hand side of the vehicle diverges along the spur of the switch track portion, the auxiliary electromagnet 14 is energized just ahead of the auxiliary armature rail 23 to permit it to take up the suspending force at the right-hand side of the vehicle as the vehicle encounters the auxiliary armature rail 23. The main electromagnet 11 at the right-hand side of the vehicle can then be switched off.

The right-hand side of the vehicle is supported by the magnetic interaction of the auxiliary armature rail section 23 and the auxiliary electromagnet 24 until the vehicle encounters the main armature rail section 17, whereupon the main electromagnet 11 is switched on to take up the suspending force at the right-hand side of the vehicle. The auxiliary electromagnet 14 may be switched off thereafter.

As the vehicle proceeds further toward the region C, the main electromagnet 11 provides the suspension force until, in the region of the intersection point 20, the auxiliary electromagnet 14 is again energized and progressively cooperates with the auxiliary armature rail section 18 to take up the suspending force, the main electromagnet 13 being deenergized. The auxiliary rail 18 thus cooperates with the auxiliary electromagnet 14 until the vehicle encounters the main armature rail section 22 at the far side of the switch portion of the track, whereupon the main electromagnet 11 is again energized and the auxiliary electromagnet 14 is deenergized and the vehicle then continues along the track in the direction of arrow 26, suspended by the main electromagnets 7 and 11 from the main armature rails 5 and 22.

For branching of the vehicle on to the spur, the main electromagnet 11 on the inner-curve side of the vehicle remains continuously energized since it cooperates with the continuous main armature rail 9 along this limb of the curve. Alternate operation of the electromagnets 7 and 13 occur on the outer-curve or left-hand side of the vehicle, i.e. along the outer limb of the curve.

Initially the electromagnet 7 cooperates with the armature rail 5 to provide the suspending force at the right-hand side of the vehicle. In order to insure complete excitation of the outer-curve auxiliary electromagnet 13 at the beginning of travel over the switch, this magnet is switched on some time before the vehicle reaches the switch portion (position A).

Since initially at the position A the auxiliary armature rail section 15 runs parallel to the main armature rail 5, the switch over from the main magnet system 5, 7 to the auxiliary magnet system 13, 15 can be carried out without causing interference between the two systems. However, when the auxiliary armature rail 15 begins to diverge from the main armature rail 5, the main electromagnet 7 must be switched off so that the supporting and guiding forces on the outer-curve side of the vehicle are then produced only by the auxiliary magnet system 13, 15.

In the position B at which the auxiliary armature rail 15 terminates and the main armature rail section 16 begins, it is necessary to transfer the suspending force from the auxiliary magnet system 13, 15 again to the main magnet system 16, 7 so that the electromagnet 7 is switched on just ahead of the position B. Over the stretch corresponding to the main armature rail section 16, the auxiliary electromagnet 13 may be deenergized.

On further travel, the vehicle approaches the armature rail intersection point 20 and the intersection region C at which the main armature rail sections 16 and 17 and the auxiliary armature rail sections 18, 19 form a doubly convergent arrangement at the center 20.

The point 20, as noted earlier, is the point of intersection of the imaginary extensions of the paths of the vehicle through the switch track, i.e. the path of the geometrical centers of the left and right hand electromagnet arrangements which must cross each other to permit switching. These paths are shown by broken lines in FIG. 2 and are defined as the paths of the "magnet holding centers". This phrase is used herein to denote the center between the main electromagnet and auxiliary electromagnet on each longitudinal side of the vehicle.

As the vehicle passes from the main armature rail 16 to the auxiliary armature rail 19, both electromagnets 7 and 13 on the outer-curve side of the vehicle remain energized because the high vehicle speed (e.g. 400 to 500 km per hour) and the comparatively short armature rail sections do not enable sufficiently rapid switching where complete on and off reversal of the electromagnet state is necessary. In other words the time required for magnetization and demagnetization of the electromagnet is long by comparison with the length of the armature rail sections seen by the vehicle at such high speeds.

The supporting and guiding forces necessary on the outer-curve of the vehicle are therefore produced up to point 20 or the end of the main armature rail section 16 by the electromagnet 7 and from the point 20 or the beginning of the armature rail section 19 onward, by the magnet 13.

Upon reaching the main armature rail 21, both electromagnets 7 and 13 generate the suspending and guiding forces so that the auxiliary electromagnet 13 can be switched off at, say, position D so that the main electromagnet 7 takes up the supporting and guiding function.

The foregoing description of the passage of the vehicle through the switch portion of the track indicates that regardless of the direction of travel and whether the vehicle continues along the main track or is branched, the corresponding side of the vehicle will have both of its electromagnets energized simultaneous through the intersection region C. The electromagnets may remain energized throughout the switch track portion except that, if the vehicle is to branch to the right, the main electromagnet 7 should be cut off at or prior to the region A to induce the branching operation of the main electromagnet 11 should be cut off just at the beginning of armature rail 23 if the vehicle is to pass undiverted along the main track (arrows 24 and 26).

Because of the simultaneous energization of both electromagnets of the corresponding side of the vehicle in the region C, the vehicle is subjected not only to the desired support and guiding forces but also the undesirable interactions between the main electromagnets 11 and 7, respectively, and the auxiliary armature rail sections 19 and 18 or between the auxiliary electromagnets 14 and 13, respectively, and the main armature rail section 17 and 16.

The nature of this interaction will be best understood from a view of the system in FIG. 3 taken in the postion of the suspended vehicle 1 just before the vehicle reaches the point of intersection 20 of the armature section 16 or 17 and 19.

In addition to the support and guiding magnetic field produced by the main magnet system 7, 16 (resulting from the continued excitation of the auxiliary electromagnet 13, an interfering field is introduced by th magnet system 13, 17 which produces perturbations in the movement of the vehicle. These forces tend to divert the suspended vehicle from its desired path.

This tendency is opposed by the gap-regulating circuitry of the vehicle but it is not possible at high vehicle speeds solely with such compensatory circuit to prevent jolts resulting from the aforementioned interference. The travel of the vehicle is thus discomforting and the stiffness requirements for the vehicle structure are increased.

According to the invention, the aforementioned magnetic interferences in the region of the junction C may be removed, reduced, or eliminated by any one or more of several measures which are described in detail below.

The first measure for reducing the interference forces has been illustrated in FIG. 4. In this system, adjacent the point of intersection C of the armature rails, the limb or shank height of the main armature rail section of the auxiliary armature rail section 16, 17 or 18, 19, is reduced from the height h to the height h so that the air gas between the pole faces of the armature rail and the electromagnets is increased.

This means that the inductance leakage of the magnet systems 7, 16 and 13, 17 increases and, accordingly, the flux densities both of the desired and of the interfering magnetic fields decrease. This reduction has a disproportionally greater effect on the interfering magnetic field of the system 13, 17 as compared with the desired magnetic field of the system 7, 16, since, as can be seen from FIG. 3, the already large air gap between the main armature rail section 17 of the auxiliary electromagnet 13 is increased further by the reduction in the limb or shank height.

A second measure, which can be used in conjunction with or independently of that described in connection with FIG. 4, has been shown in FIG. 5. In this case, the ends of the rail which approach one another are bent to diverge from the point C. In FIG. 5 the normal extensions of the main armature rail sections and auxiliary armature rails sections 16, 17 and 18, 19 are shown by dot-dash lines whereas the orientations of these rails are shown in solid lines for the switching of a transport system in accordance with the invention.

In prior art systems it has been the desire to bring about the best possible match between the course of the main armature rail sections and the auxiliary armature rail sections 16, 17 and 18, 19 adjacent the intersection region C in order to insure that the pole surfaces of the magnet system in operation precisely overlap. However, in accordance with the present invention, the distance d between the main armature rail and the auxiliary armature rail section 16, 17 and 18, 19 and the line of the magnetic holding centers adjacent the intersection point 20 continuously increases as the two rails 16, 18 or 17, 19 approach one another.

Thus the pole surfaces of the armature rails and the respective electromagnets adjacent the junction height C no longer overlap exactly and there is, instead, a lateral offsetting of the associated pole surfaces so that the air gap between the pole surfaces is increases and accordingly induction leakage is increased. As a consequence, the desired magnet system is influenced to a substantially lesser degree than the interfering magnet system thereby reducing the interference forces.

A third possibility has been shown in FIG. 5 (to be used in conjunction with the system originally described in connection with this Figure or in connection with the system of FIG. 4 or both), namely that of providing an air gap with a width s between the mutually aligned armature rails. As can be seen in FIG. 6a, instead of the air gap s, a body S of aluminum or other nonmagnetic material can be disposed between the aligned rail ends.

In either case there is a weakening of the supporting and guiding magnetic field and also the interfering field adjacent the point of interception 20. The weakening of the interfering field is disproportionally large by comparison with the weakening of the supporting magnetic field.

In FIGS. 6 and 6A there is shown another system for reducing the interfering forces by proper arrangement of the pole or shank shapes of the armature rails. In this case, the limbs or shanks of the main and auxiliary armature rail pieces progressively deviate from the parallel orientation of a U-shaped cross section elsewhere along the rails in such manner that the lateral limbs are bent outwardly to increase the air gaps between the pole surfaces of the armature rails and the electromagnets. Other systems for changing the pole shape include pointing the limbs of the armature rails adjacent the pole surfaces on both sides or limbs (FIG. 7) or on one side (FIG. 8). In all of these cases, there is a disproportionate weakening of the undesired interfering magnetic field as compared with the supporting and guiding magnetic fields.

The aforedescribed systems are applicable to channel-shaped track structures in which the vehicle aprons 8 and 12 are straddled by the rail members 6 and 10. A similar construction also applies to an arrangement in which the vehicle, as shown in FIG. 9, straddles a central track beam 2. In FIGS. 9 and 10 similar reference numerals refer to similar structure to that described in connection with FIGS. 1 and 2.

In the system of FIGS. 9 and 10, the main electromagnets 7 and 11 lie inwardly of the respective auxiliary electromagnets 13 and 14 and cooperate with armature rails 5 and 9, for example, affixed to the central beams of the track.

In this embodiment, travel of the vehicle in the direction of arrows 24 and 26 along the straight part of the track requires interruption of the main and auxiliary magnetic fields on both sides of the vehicle.

Prior to entering the switch portion of the track, the main electromagnets 7 and 11 cooperate with the main armature rail sections 5a and 9a of the armature rails 5 and 9 to carry the vehicle by the main magnetic systems. As the vehicle approaches the region A, the auxiliary electromagnet 13 is switched on and the main electromagnet 7 is thereafter switched off so that the left-hand side of the vehicle is suspended by the electromagnet 13 from the armature rail section 15. The right-hand side of the vehicle continues to be suspended from the armature rail section 9a. In the region $B_1$, the suspending action is transferred from the electromagnet 13 on the left-hand side of the vehicle to the electromagnet 7 which cooperates with the main armature rail section 5b of armature rail 5 to support the left-hand side of the vehicle. In the region $B_2$, however the electromagnet 11 is extinguished and electromagnet 13 is energized to support the right-hand of the vehicle on the armature rail section 19.

In the region of the intersection site C, the right-hand supporting force is eventually taken over by the main armature rail section 22 which cooperates with the electromagnet 11, the latter being energized through the region C concurrently with the auxiliary electromagnet 14.

If the vehicle is to branch to the right (arrows 24 and 25) the main electromagnet 7 remains energized at the region A while electromagnet 11 is extinguished and auxiliary electromagnet 14 is energized to cooperate with the auxiliary armature rail section 23. In the regions $B_1$ and $B_2$, the main electromagnet 7 is turned off and the auxiliary electromagnet 13 is turned on to cooperate with the armature rail section 18 while the auxiliary electromagnet 14 is turned off and the main electromagnet 11 is turned on to cooperate with the armature rail section 9b.

Through the region C, both the electromagnet 13 and the electromagnet 7 are energized so that eventually the electromagnet 7 cooperates with the main armature rail section 21 to support the left-hand side of the vehicle while the right-hand side of the vehicle continues to be supported on the main armature rail 9b by the main electromagnet 11.

At the intersection C the armature rails are constructed as described with respect to FIGS. 3 through 8. In FIG. 10, the positions $B_1$ and $B_2$ correspond to the position B in the switch portion of FIG. 2.

I claim:

1. A magnetic suspension transport system comprising a track having a switch portion, a vehicle displaceable along said track, a respective main magnet system and auxiliary magnet system provided along each side of the vehicle and track for magnetically suspending said vehicle from and guiding said vehicle along said track, each of said systems comprising an electromagnetic primary part and an armature rail secondary part generating suspending forces between them upon energization of the electromagnet part, the primary part of each of said systems being mounted on said vehicle and the secondary part of each system being mounted on said track, said track parts having a junction site at a switch portion of the track defined as the point at which the line described by a center between the parts on one side of the vehicle intersects the line described by the center between the parts on the other side of said vehicle for passage along a spur of the switch portion and straight passage through the switch portion respectively, and means for reducing, as said vehicle approaches said intersection, the magnetic interaction between the parts of each system on the side of the vehicle traversing said intersection and the parts of the other system at the same side of said vehicle at a rate greater than the decrease in magnetic interaction between the primary and secondary parts of the same system on the side of the vehicle traversing said intersection, the armature rails of the main and auxiliary electromagnets diverging away from their respective lines toward said intersection.

2. The transport system defined in claim 1 wherein the main armature rails of the main and auxiliary systems have decreased limb height in the region of said point of intersection.

3. The transport system defined in claim 1 wherein an auxiliary armature rail and a main armature rail aligned at said point of intersection with a nonmagnetic gap between them.

4. The transport system defined in claim 3 wherein said gap is an air gap.

5. The transport system defined in claim 3 wherein said gap is filled with a solid nonmagnetic material.

6. The transport system defined in claim 1 wherein said armature rails have generally U-shaped sections with limb shapes differing in the region of said intersections from the limb shapes remote therefrom.

7. The transport system defined in claim 6 wherein said limbs of the armature rails diverge increasingly outwardly in the direction of said intersection.

8. The transport system defined in claim 6 wherein said limbs have pointed poles in the region of said intersection.

* * * * *